United States Patent
Irie et al.

(10) Patent No.: US 11,930,275 B2
(45) Date of Patent: Mar. 12, 2024

(54) CONTROL DEVICE OF IMAGING DEVICE, IMAGING DEVICE, CONTROL METHOD OF IMAGING DEVICE, AND CONTROL PROGRAM OF IMAGING DEVICE WITH IMAGE SHAKE CORRECTION

(71) Applicant: FUJIFILM Corporation, Tokyo (JP)

(72) Inventors: Fuminori Irie, Saitama (JP); Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 212 days.

(21) Appl. No.: 17/392,265

(22) Filed: Aug. 3, 2021

(65) Prior Publication Data
US 2021/0368102 A1   Nov. 25, 2021

Related U.S. Application Data

(63) Continuation of application No. PCT/JP2020/008174, filed on Feb. 27, 2020.

(30) Foreign Application Priority Data

Feb. 27, 2019   (JP) ................................ 2019-034957

(51) Int. Cl.
*H04N 23/68*   (2023.01)
*H04M 1/72*   (2021.01)

(52) U.S. Cl.
CPC ....... *H04N 23/687* (2023.01); *H04N 23/6812* (2023.01); *H04M 1/72* (2013.01)

(58) Field of Classification Search
CPC .. H04N 23/687; H04N 23/6812; H04N 23/00; H04N 23/663; H04M 1/72; H04M 1/72403; H04M 2250/52; G03B 5/00; G03B 17/14
See application file for complete search history.

(56) References Cited

U.S. PATENT DOCUMENTS

2008/0101783 A1   5/2008   Kanda et al.
2010/0271496 A1   10/2010   Obu
(Continued)

FOREIGN PATENT DOCUMENTS

CN   101251702   8/2008
JP   2006034907   2/2006
(Continued)

OTHER PUBLICATIONS

"Office Action of China Counterpart Application" with English translation thereof, dated Apr. 25, 2022, p. 1-p. 14.
(Continued)

*Primary Examiner* — Padma Haliyur
(74) *Attorney, Agent, or Firm* — JCIPRNET

(57) ABSTRACT

A control device of an imaging device that includes an imaging element which images a subject through a lens device including a vibration-proof lens includes: an image shake correcting unit that corrects an image shake of a captured image output from the imaging element by moving the imaging element or moving an acquisition range of the captured image on a light receiving surface of the imaging element; and a lens position acquiring unit that acquires a position of the vibration-proof lens in a direction perpendicular to an optical axis of the lens device, and the image shake correcting unit controls a movable range of the imaging element or a movable range of the acquisition range based on the position of the vibration-proof lens acquired by the lens position acquiring unit.

19 Claims, 10 Drawing Sheets

(56) References Cited

U.S. PATENT DOCUMENTS

| | | | |
|---|---|---|---|
| 2013/0202280 A1 | 8/2013 | Shimohata et al. | |
| 2016/0073005 A1* | 3/2016 | Sugita | H04N 23/663 |
| | | | 348/349 |
| 2016/0134814 A1* | 5/2016 | Yoneyama | H04N 23/698 |
| | | | 348/208.11 |
| 2017/0309002 A1 | 10/2017 | Koyano | |
| 2019/0230288 A1* | 7/2019 | Tsuchiya | H04N 23/687 |
| 2019/0289216 A1* | 9/2019 | Ito | H04N 23/687 |
| 2021/0297598 A1* | 9/2021 | Ohishi | G03B 17/14 |

FOREIGN PATENT DOCUMENTS

| | | |
|---|---|---|
| JP | 2008145662 | 6/2008 |
| JP | 2010258570 | 11/2010 |
| JP | 2011217311 | 10/2011 |
| JP | 2013178505 | 9/2013 |
| JP | 2016080918 | 5/2016 |
| JP | 2016090973 | 5/2016 |
| JP | 2017195516 | 10/2017 |
| WO | 2018018616 | 2/2018 |

OTHER PUBLICATIONS

"International Search Report (Form PCT/ISA/210) of PCT/JP2020/008174," dated Jun. 2, 2020, with English translation thereof, pp. 1-5.

"Written Opinion of the International Searching Authority (Form PCT/ISA/237)" of PCT/ JP2020/008174, dated Jun. 2, 2020, with English translation thereof, pp. 1-6.

* cited by examiner

CONTROL DEVICE OF IMAGING DEVICE, IMAGING DEVICE, CONTROL METHOD OF IMAGING DEVICE, AND CONTROL PROGRAM OF IMAGING DEVICE WITH IMAGE SHAKE CORRECTION

CROSS REFERENCE TO RELATED APPLICATION

This is a continuation of International Application No. PCT/JP2020/008174 filed on Feb. 27, 2020, and claims priority from Japanese Patent Application No. 2019-034957 filed on Feb. 27, 2019, the entire disclosures of which are incorporated herein by reference.

BACKGROUND OF THE INVENTION

1. Field of the Invention

The present invention relates to a control device of an imaging device, an imaging device, a control method of an imaging device, and a computer readable medium storing a control program of an imaging device.

2. Description of the Related Art

As an imaging device comprising an imaging element that images a subject through an imaging optical system, or a lens device mounted on such an imaging device, a device having an image shake correcting function that corrects a shake of a captured image (hereinafter, referred to as an image shake) caused by vibration of the device has been known.

JP2017-195516A discloses a camera system and a camera main body which can perform accurate distortion correction in consideration of the shape change of the distortion on the image surface due to the eccentricity of the vibration-proof optical system by a simple method. The interchangeable lens includes the vibration-proof optical system, a shake amount acquiring unit, and a shake correction control unit, and the camera main body includes a distortion correction unit. The distortion correction unit acquires distortion correction information for correcting the distortion of the imaging optical system and first lens information which includes the function indicating a correlation between the shape of the distortion on the image surface in accordance with the driving amount of the vibration-proof optical system and the shape of the distortion on the image surface in accordance with the deviation amount between the optical axis and the image center of the captured image, converts the deviation amount between the optical axis and the image center of the captured image by using the function to calculate the conversion deviation amount, and performs distortion correction on the captured image based on the distortion correction information and the conversion deviation amount.

JP2016-090973A discloses an imaging device that performs wide angle imaging in which camera shake is prevented by properly using two vibration-proof mechanisms. The imaging device comprises a first vibration-proof control unit that controls a first vibration-proof unit which corrects camera shake by moving a lens, a second vibration-proof control unit that controls a second vibration-proof unit which corrects the camera shake by moving an imaging element, a wide angle image generating unit that generates a wide angle image based on a plurality of images sequentially captured in a moved imaging range obtained by moving the imaging range for wide angle imaging by at least any of the first vibration-proof control unit or the second vibration-proof control unit, and a setting unit that performs setting whether the first vibration-proof unit and the second vibration-proof unit are used for the camera shake correction or used for movement of the imaging range.

SUMMARY OF THE INVENTION

The present invention is to provide a control device of an imaging device, an imaging device, a control method of an imaging device, and a computer readable medium storing a control program of an imaging device, which can improve the captured image quality while realizing the high image shake correction performance.

A control device of an imaging device according to an aspect of the present invention is a control device of an imaging device that includes an imaging element which images a subject through a lens device including a vibration-proof lens, the control device comprising an image shake correcting unit that corrects an image shake of a captured image output from the imaging element by moving the imaging element or moving an acquisition range of the captured image on a light receiving surface of the imaging element, and a lens position acquiring unit that acquires a position of the vibration-proof lens in a direction perpendicular to an optical axis of the lens device, in which the image shake correcting unit controls a movable range of the imaging element or a movable range of the acquisition range based on the position of the vibration-proof lens acquired by the lens position acquiring unit.

An imaging device according to another aspect of the present invention is an imaging device comprising the control device of an imaging device according to the aspect of the present invention, and the imaging element. An imaging device according to still another aspect of the present invention is an imaging device comprising the control device according to the aspect of the present invention, a position detecting unit that detects the position of the vibration-proof lens, and the vibration-proof lens.

A control method of an imaging device according to still another aspect of the present invention is a control method of an imaging device that includes an imaging element which images a subject through a lens device including a vibration-proof lens, the method comprising an image shake correcting step of correcting an image shake of a captured image output from the imaging element by moving the imaging element or moving an acquisition range of the captured image on a light receiving surface of the imaging element, and a lens position acquiring step of acquiring a position of the vibration-proof lens in a direction perpendicular to an optical axis of the lens device, in which in the image shake correcting step, a movable range of the imaging element or a movable range of the acquisition range is controlled based on the position of the vibration-proof lens acquired in the lens position acquiring step.

A control program of an imaging device according to still another aspect of the present invention is a control program of an imaging device that includes the imaging element which images a subject through a lens device including a vibration-proof lens, the program causing a computer to execute a control method of the imaging device, in which the control method includes an image shake correcting step of correcting an image shake of a captured image output from the imaging element by moving the imaging element or moving an acquisition range of the captured image on a light receiving surface of the imaging element, and a lens position acquiring step of acquiring a position of the vibration-proof lens in a direction perpendicular to an optical axis of the lens device, and in the image shake correcting step, a movable range of the imaging element or a movable range of the acquisition range is controlled based on the position of the vibration-proof lens acquired in the lens position acquiring step.

According to the present invention, it is possible to provide a control device of an imaging device, an imaging device, a control method of an imaging device, and control program of an imaging device, which can improve the captured image quality while realizing the high image shake correction performance.

DESCRIPTION OF THE PREFERRED EMBODIMENTS

In an imaging device in which a method of performing image shake correction by moving a vibration-proof lens (hereinafter, appropriately referred to as "lens shift correction") and a method of performing the image shake correction by moving an imaging element (hereinafter, appropriately referred to as "sensor shift correction") are used together, a subject image formed on a light receiving surface of the imaging element is moved together with the vibration-proof lens. However, in JP2017-195516A and JP2016-090973A, the sensor shift correction is performed by moving the imaging element within a certain narrow movable range symmetrical with respect to the optical axis of the lens device regardless of the movement position of the vibration-proof lens by the lens shift correction, so that the range in which the image quality can be guaranteed by the sensor shift correction is narrow. Therefore, depending on the position of the vibration-proof lens, the image shake correction performance may not be sufficiently exhibited, and the quality of the captured image may deteriorate. In addition, the same problem may occur in a case in which the lens shift correction and the method of performing the image shake correction by moving the acquisition range of the captured image on the light receiving surface of the imaging element (hereinafter, appropriately referred to as "electronic correction") are used together. JP2017-195516A and JP2016-090973A do not recognize such a problem. An embodiment of an imaging device that can solve this problem will be described below.

Figure 1:
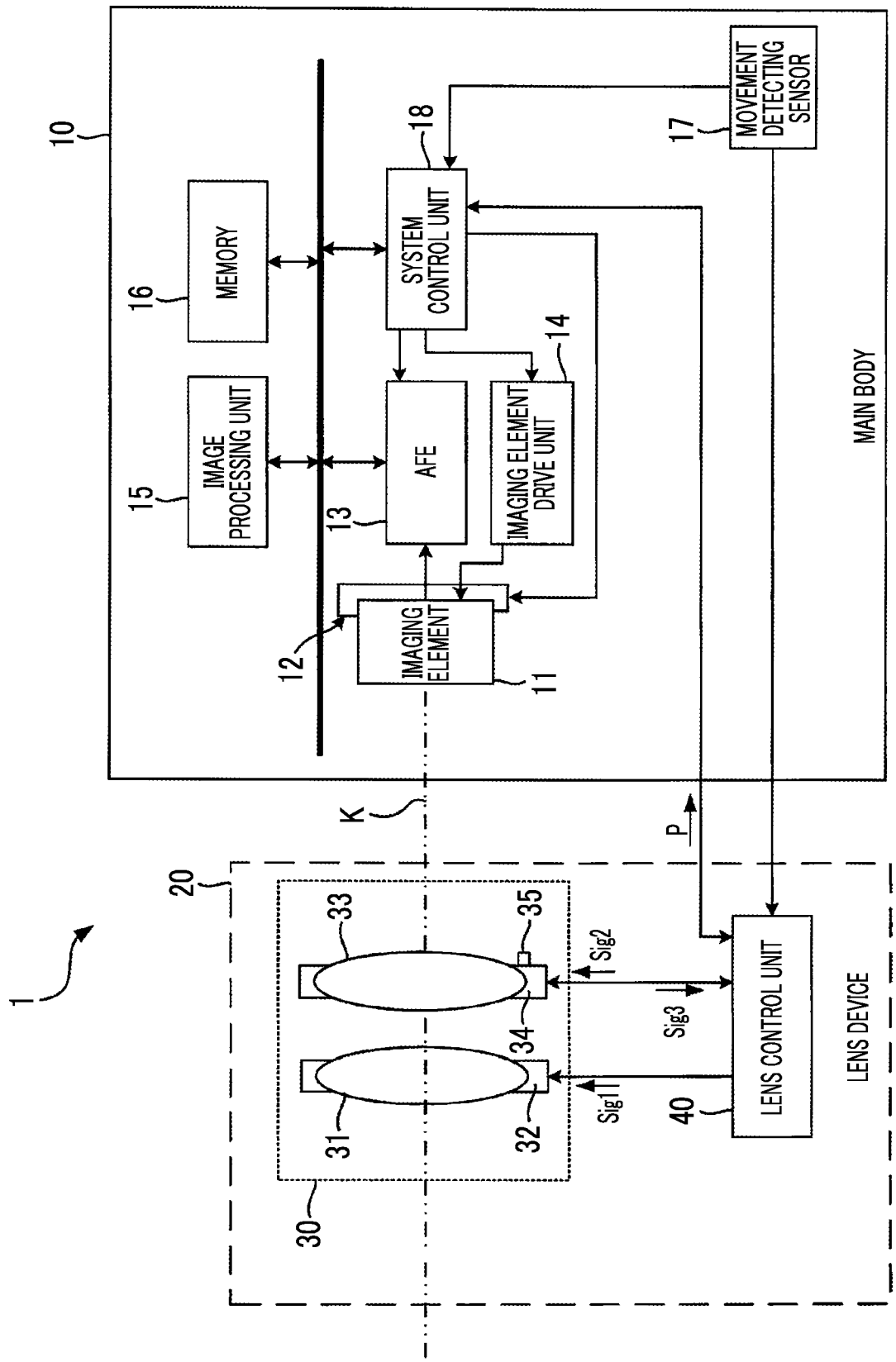
FIG. 1 is a diagram showing a schematic configuration of a digital camera, which is an embodiment of an imaging device of the present invention.

FIG. 1 is a diagram showing a schematic configuration of a digital camera 1, which is an embodiment of an imaging device of the present invention.

The digital camera 1 comprises a camera main body 10 and a lens device 20. The lens device 20 may be attachable to and detachable from the camera main body 10 or may be fixed to the camera main body 10.

The lens device 20 includes an imaging optical system 30 and a lens control unit 40.

The imaging optical system 30 includes an imaging lens 31, an imaging lens drive mechanism 32, a vibration-proof lens 33, and a vibration-proof lens drive mechanism 34. Further, the imaging optical system 30 comprises a stop mechanism (not shown).

The imaging lens 31 is a lens for adjusting the focus of the imaging optical system 30, and is composed of a single lens or a plurality of lenses. The imaging lens 31 is driven by the imaging lens drive mechanism 32. The imaging lens drive mechanism 32 moves the imaging lens 31 in an optical axis direction based on an imaging lens control signal Sig1 from the lens control unit 40. Focus is adjusted by moving the imaging lens 31 in the optical axis direction.

The vibration-proof lens 33 is a lens that corrects image shake. The vibration-proof lens 33 is driven by the vibration-proof lens drive mechanism 34. The vibration-proof lens drive mechanism 34 moves the vibration-proof lens 33 in a direction orthogonal to an optical axis K of the lens device 20 based on a vibration-proof lens control signal Sig2 from the lens control unit 40. Image shake is optically corrected by moving the vibration-proof lens 33 in the direction orthogonal to the optical axis K of the lens device 20.

The vibration-proof lens drive mechanism 34 has a lens position detecting sensor 35 that detects a movement position of the vibration-proof lens 33. For the lens position detecting sensor 35, for example, a hall element or the like is used. The lens position detecting sensor 35 outputs a position detection signal Sig3 in accordance with the movement position of the vibration-proof lens 33. The position detection signal Sig3 is input to the lens control unit 40.

The lens control unit 40 outputs the vibration-proof lens control signal Sig2 for controlling the movement of the vibration-proof lens 33 based on movement information M of the digital camera 1 detected by a movement detecting sensor 17 which will be described below and the position detection signal Sig3.

Further, the lens control unit 40 outputs positional information P indicating the movement position of the vibration-proof lens 33 based on the position detection signal Sig3. The positional information P may be replaced with the position detection signal Sig3 or the vibration-proof lens control signal Sig2. The positional information P is input to the camera main body 10.

The camera main body 10 comprises an imaging element 11, an imaging element moving mechanism 12, an analog front end (AFE) 13, an imaging element drive unit 14, an image processing unit 15, a memory 16, the movement detecting sensor 17, and a system control unit 18.

The imaging element 11 images a subject through the imaging optical system 30. The imaging element 11 is configured by a charge coupled device (CCD) image sensor or a complementary metal oxide semiconductor (CMOS) image sensor which images a subject through the imaging optical system.

The imaging element moving mechanism 12 is a mechanism that moves the imaging element 11 on a surface perpendicular to the optical axis K of the imaging optical system 30.

The AFE 13 includes a signal processing circuit that performs sampling two correlation pile processing, digital conversion processing, and the like on an imaging signal output from the imaging element 11.

The image processing unit 15 processes the imaging signal processed by the AFE 13 into the digital signal to generate captured image data in a joint photographic experts group (JPEG) format or the like. The image data which is generated by the image processing unit 15 is recorded in the memory 16.

The movement detecting sensor 17 is a sensor that detects the movement of the digital camera 1. The movement detecting sensor 17 is configured by an acceleration sensor, an angular velocity sensor, or both of these. The movement detecting sensor 17 may be provided in the lens device 20.

The system control unit 18 controls the imaging element drive unit 14 and the AFE 13 to image the subject by the imaging element 11, and outputs the imaging signal corresponding to the subject image from the imaging element 11. In this case, the system control unit 18 controls the imaging element moving mechanism 12 based on the movement information M of the digital camera 1 detected by the movement detecting sensor 17 and the positional information P from the lens control unit 40.

The system control unit 18 controls the entire digital camera 1 in an integrated manner, and the hardware structure includes various processors that execute the program and perform processing.

Examples of the various processors include a central processing unit (CPU), which is a general-purpose processor that executes a program and performs various processing, programmable logic device (PLD), which is a processor whose circuit configuration can be changed after manufacturing, such as field programmable gate array (FPGA), or a dedicated electric circuit, which is a processor having a circuit configuration specially designed for executing specific processing such as an application specific integrated circuit (ASIC), and the like. The structure of these various processors is, more specifically, an electric circuit in which circuit elements such as semiconductor elements are combined.

The system control unit 18 may be configured by one of the various processors, or may be configured by a combination of two or more processors of the same type or different types (for example, a combination of a plurality of the FPGAs or a combination of the CPU and the FPGA).

Figure 2:
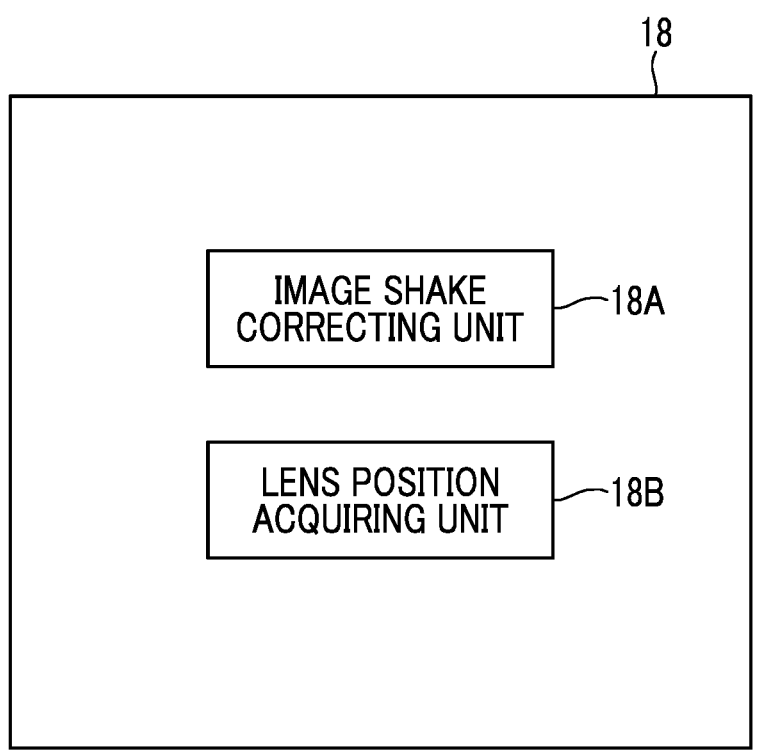
FIG. 2 is a functional block diagram of a system control unit 18 of a digital camera 1 shown in FIG. 1.

FIG. 2 is a functional block diagram of the system control unit 18 of the digital camera 1 shown in FIG. 1. The system control unit 18 executes a control program to function as an image shake correcting unit 18A and a lens position acquiring unit 18B.

The lens position acquiring unit 18B performs lens position detection processing of acquiring the position of the vibration-proof lens 33 in the direction perpendicular to the optical axis K of the lens device 20 based on the positional information P from the lens control unit 40.

The image shake correcting unit 18A performs sensor shift correction, that is, the image shake correction processing of correcting the image shake of the captured image output from the imaging element 11 by moving the imaging element 11 within a movable range R. In this case, the image shake correcting unit 18A controls the movable range R of the imaging element 11 for the sensor shift correction based on the positional information P from the lens control unit 40.

Figure 3:
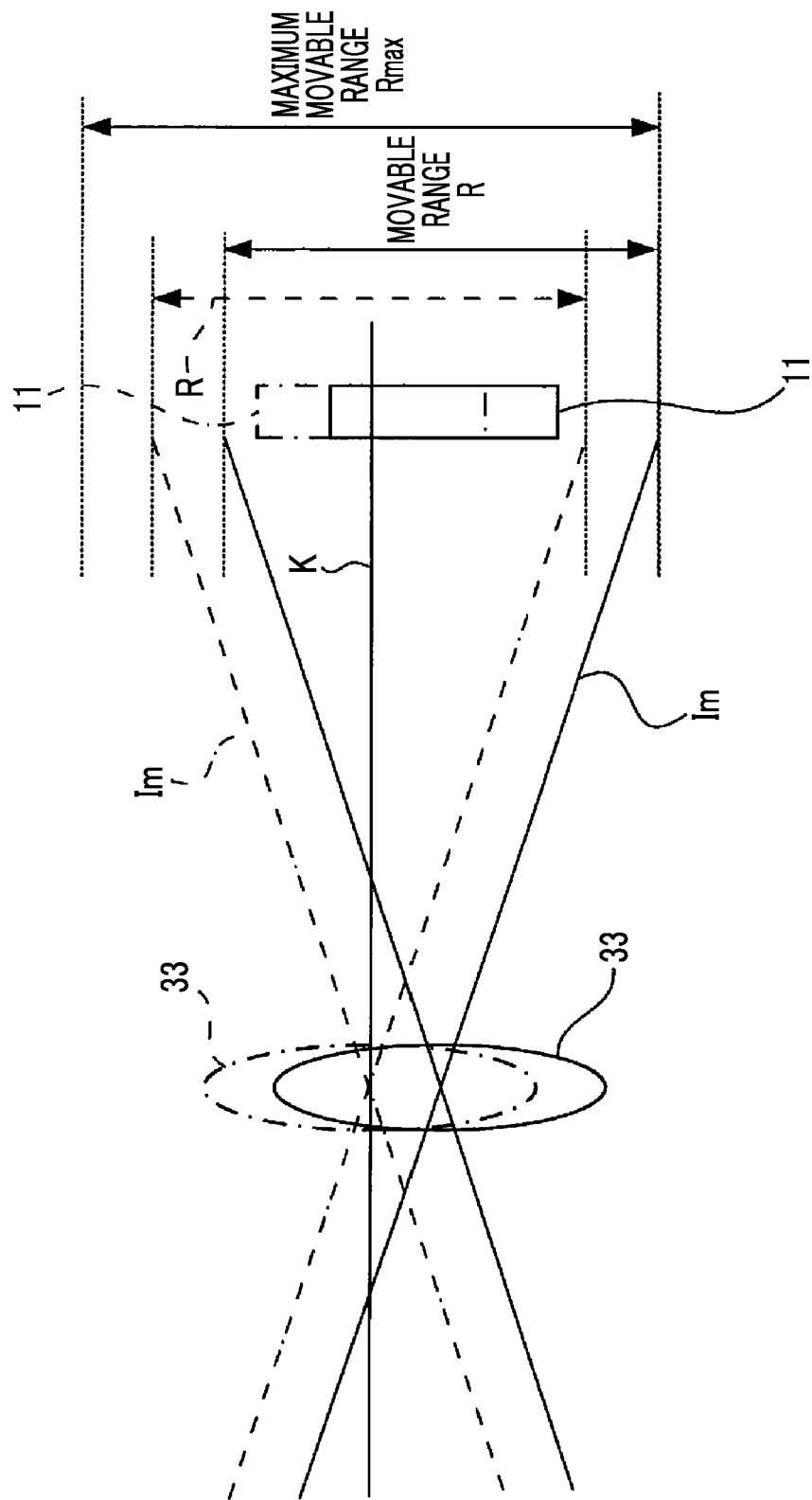
FIG. 3 is an explanatory diagram of the principle of image shake correction in the digital camera 1 shown in FIG. 1.
Figure 4:
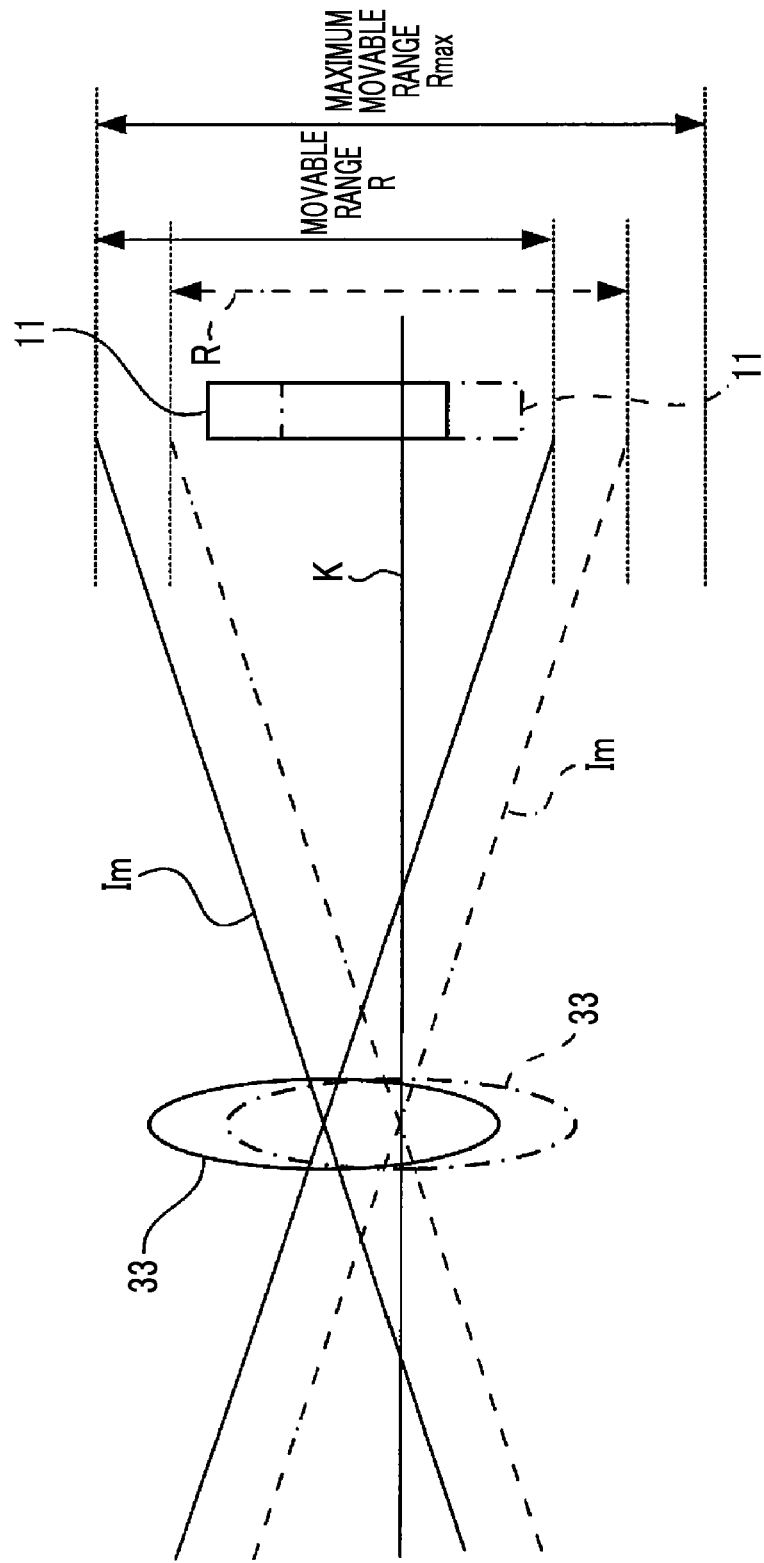
FIG. 4 is an explanatory diagram of the principle of the image shake correction in the digital camera 1 shown in FIG. 1.

FIGS. 3 and 4 are explanatory diagrams of the principle of the image shake correction in the digital camera 1 shown in FIG. 1. In FIGS. 3 and 4, the vibration-proof lens 33, the imaging element 11, and the movable range R when the digital camera 1 does not vibrate are shown by a single-dot chain line, and the vibration-proof lens 33, the imaging element 11, the movable range R, and a maximum movable range Rmax when the digital camera 1 vibrates are shown by a solid line. Further, in FIGS. 3 and 4, a subject image Im when the digital camera 1 does not vibrate is shown by a two-dot chain line, and the subject image Im when the digital camera 1 generates vibration is shown by a solid line.

The subject image Im is an image within the range in which the image quality can be guaranteed by the lens device 20. In a case in which the subject image Im is formed on the light receiving surface of the imaging element 11, the captured image of the subject image Im is an image without distortion in the periphery, and the image quality is guaranteed. That is, the width in the direction orthogonal to the optical axis K at the position of the light receiving surface of the imaging element 11 of the subject image Im is an image quality guaranteed range in which the image quality can be guaranteed by the lens device 20.

The image shake correcting unit 18A sets a part of the maximum movable range Rmax of the imaging element 11 as the movable range R of the imaging element 11 for the sensor shift correction. The maximum movable range Rmax is a mechanical limit range in which the imaging element 11 can be moved by the imaging element moving mechanism 12. The image shake correcting unit 18A decides the movable range R based on the positional information P from the lens control unit 40 and optical information of the lens device 20. Specifically, the image shake correcting unit 18A recognizes the image quality guaranteed range of the lens device 20 in the current point in time based on the positional information P, and decides the image quality guaranteed range as the movable range R.

In a case in which the movable range R is not controlled, the movable range R of the imaging element 11 for the sensor shift correction is a certain range (movable range R indicated by the single-dot chain line in FIGS. 3 and 4) symmetrical with respect to the optical axis K. In this case, the range in which the image quality can be guaranteed by the sensor shift correction is limited to the range narrower than the maximum movable range Rmax.

As shown in FIG. 3, in a case in which the vibration-proof lens 33 is moved downward from the position of the single-dot chain line for the lens shift correction, the image quality guaranteed range is moved downward together with the vibration-proof lens 33. In this case, the image shake correcting unit 18A recognizes the image quality guaranteed range of the lens device 20 based on the movement position of the vibration-proof lens 33, that is, the positional information P, and controls the imaging element moving mechanism 12 to move the movable range R downward such that the image quality guaranteed range becomes the movable range R of the imaging element 11.

As shown in FIG. 4, in a case in which the vibration-proof lens 33 is moved upward from the position of the single-dot chain line for the lens shift correction, the image quality guaranteed range of the lens device 20 is moved upward together with the vibration-proof lens 33. In this case, the image shake correcting unit 18A recognizes the image quality guaranteed range of the lens device 20 based on the movement position of the vibration-proof lens 33, that is, the positional information P, and controls the imaging element moving mechanism 12 to move the movable range R upward such that the image quality guaranteed range becomes the movable range R of the imaging element 11.

As described above, the movable range R of the imaging element 11 is moved within the maximum movable range Rmax in accordance with the movement position of the vibration-proof lens 33 for the lens shift correction, and the sensor shift correction is performed by moving the imaging element 11 within the movable range R, so that the range in which the image quality can be guaranteed by the sensor shift correction can be expanded to a wide range as compared with a case in which the movable range R is not controlled. Specifically, the range in which image quality can be guaranteed by the sensor shift correction is expanded to the maximum movable range Rmax. Therefore, it is possible to improve the captured image quality while realizing the high image shake performance.

Figure 5:
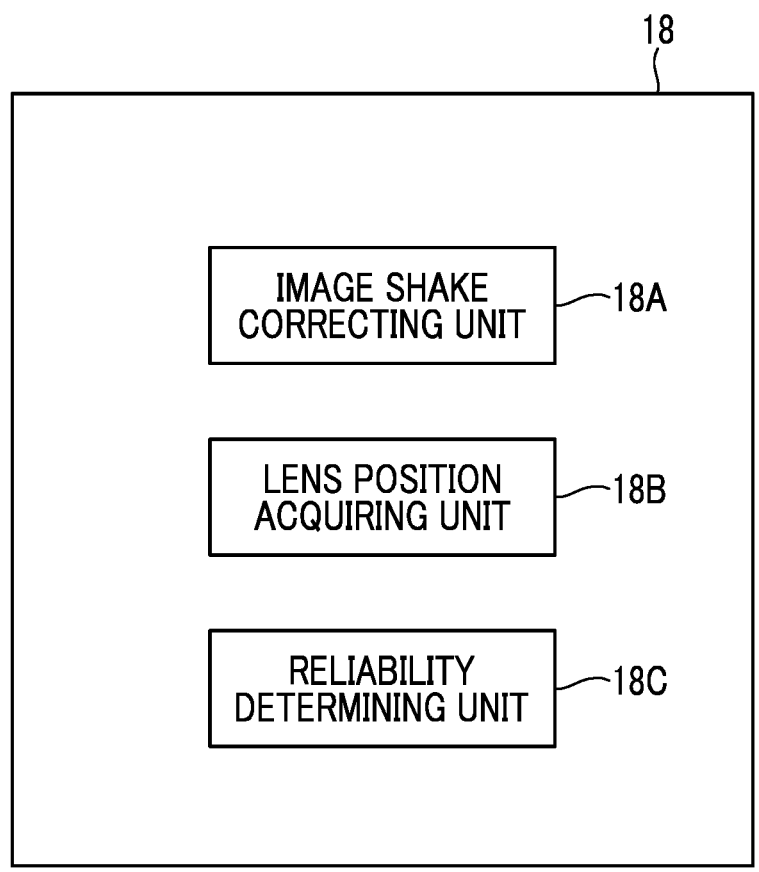
FIG. 5 is a functional block diagram showing another configuration example of the system control unit 18.

FIG. 5 is a functional block diagram showing another configuration example of the system control unit 18. The system control unit 18 shown in FIG. 5 executes a control program to function as the image shake correcting unit 18A, the lens position acquiring unit 18B, and a reliability determining unit 18C.

The lens position acquiring unit 18B performs processing of estimating the position of the vibration-proof lens 33 in the direction orthogonal to the optical axis K of the lens device 20 based on the movement amount of the digital camera 1 and acquiring the estimated position as the position of the vibration-proof lens 33. The movement amount of the digital camera 1 is provided to the lens position acquiring unit 18B as the movement information M from the movement detecting sensor 17. Therefore, the positional information P from the lens control unit 40 is not needed. Further, the lens control unit 40 controls the movement position of the vibration-proof lens 33 based on the movement information M such that the movement amount of the digital camera 1 is offset. As a result, it is possible to estimate the position of the vibration-proof lens 33 from this movement information M.

The reliability determining unit 18C performs reliability determination processing of determining the reliability of the estimation result of the position by the lens position acquiring unit 18B.

The image shake correcting unit 18A has a function of controlling the movable range R of the imaging element 11 for the sensor shift correction based on the position estimated by the lens position acquiring unit 18B (hereinafter, referred to as "estimated position"), and performs the image shake correction processing of correcting the image shake of the captured image output from the imaging element 11 by moving the imaging element 11 within a movable range R. In this case, the image shake correcting unit 18A decides, based on the reliability determined by the reliability determining unit 18C, whether or not to execute the processing of controlling the movable range R based on the estimated position.

The specific content of the processing of controlling the movable range R is the same as that shown in FIGS. 3 and 4. For example, in a case in which the vibration-proof lens 33 is moved downward for the lens shift correction, the image quality guaranteed range of the lens device 20 is moved downward together with the vibration-proof lens 33. In this case, the image shake correcting unit 18A recognizes the image quality guaranteed range based on the estimated position of the vibration-proof lens 33, and controls the imaging element moving mechanism 12 such that the image quality guaranteed range becomes the movable range R of the imaging element 11.

Figure 6:
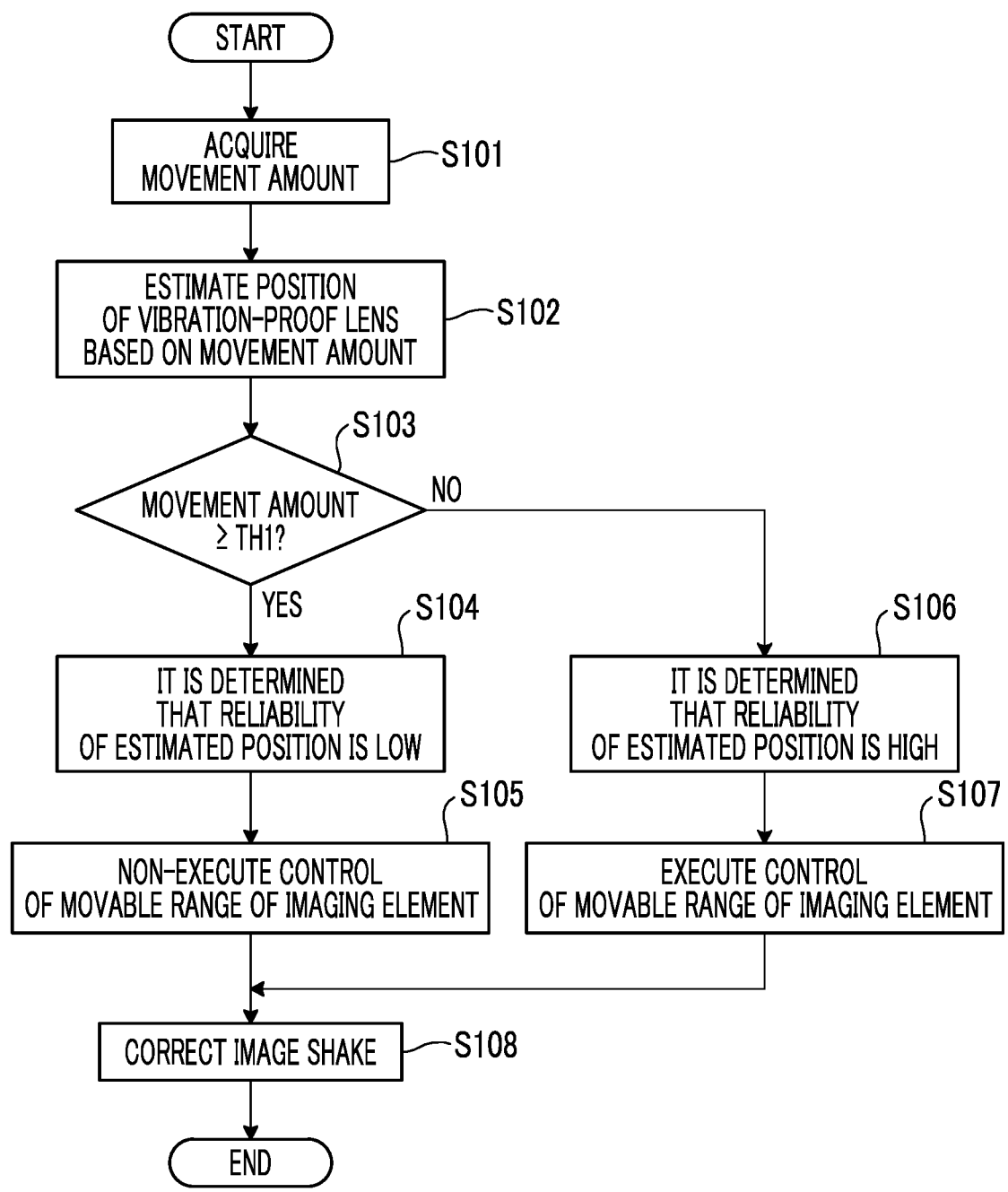
FIG. 6 is a flowchart for explaining an image shake correction operation by the system control unit 18 shown in FIG. 5.

FIG. 6 is a flowchart for explaining the image shake correction operation by the system control unit 18 shown in FIG. 5. In the following description, the digital camera 1 has a function (hereinafter, referred to as "returning function") of returning the vibration-proof lens 33 to a reference position (specifically, a center position of the movable range) in a case in which the movement amount of the camera main body 10 or the lens device 20 is equal to or more than a first threshold value TH1.

First, the movement amount of the digital camera 1 is acquired by the lens position acquiring unit 18B (step S101), and the position of the vibration-proof lens 33 is estimated based on the movement amount (step S102).

Next, the reliability determining unit 18C determines whether or not the movement amount of the digital camera 1 is equal to or more than the first threshold value TH1 (step S103).

In a case in which the movement amount of the digital camera 1 is equal to or more than the first threshold value TH1 (step S103: YES), the reliability determining unit 18C determines that the reliability of the estimated position is low (stated another way, the reliability is less than a reliability threshold value) (step S104). In this case, the returning function works, and there is a high possibility that the estimated position of the vibration-proof lens 33 based on the movement amount of the digital camera 1 and an actual position of the vibration-proof lens 33 deviate from each other.

In this case, the image shake correcting unit 18A does not execute a control of the movable range R of the imaging element 11 (step S105), that is, in a state in which the movable range R is fixed to a certain range symmetrical with respect to the optical axis K, performs the image shake correction processing (step S108).

On the other hand, in a case in which it is determined that the movement amount of the digital camera 1 is less than the first threshold value TH1 (step S103: NO), the reliability determining unit 18C determines that the reliability of the estimated position is high (stated another way, the reliability is equal to or more than the reliability threshold value) (step S106).

In this case, the image shake correcting unit 18A controls the movable range R of the imaging element 11 based on the estimated position of the vibration-proof lens 33 estimated by the lens position acquiring unit 18B (step S107), and performs image shake correction processing (step S108).

As described above, the position of the vibration-proof lens 33 is estimated based on the movement amount of the digital camera 1, and the movable range R of the imaging element 11 is controlled based on the estimated position, so that the movable range R of the imaging element 11 can be controlled based on the estimated position without acquiring the positional information P from the lens device 20. As a result, the processing amount of the system control unit 18 can be reduced as compared with the case in which the movable range R of the imaging element 11 is controlled based on the positional information P from the lens control unit 40.

Then, only in a case in which it is determined that the reliability of the estimated position is high, the movable range R of the imaging element 11 is controlled based on the estimated position and the image shake correction is performed by the sensor shift correction by moving the imaging element 11 within the movable range R, so that it is possible to prevent deterioration of the image quality due to controlling of the movable range R of the imaging element 11 based on the estimated position with low reliability.

Figure 7:
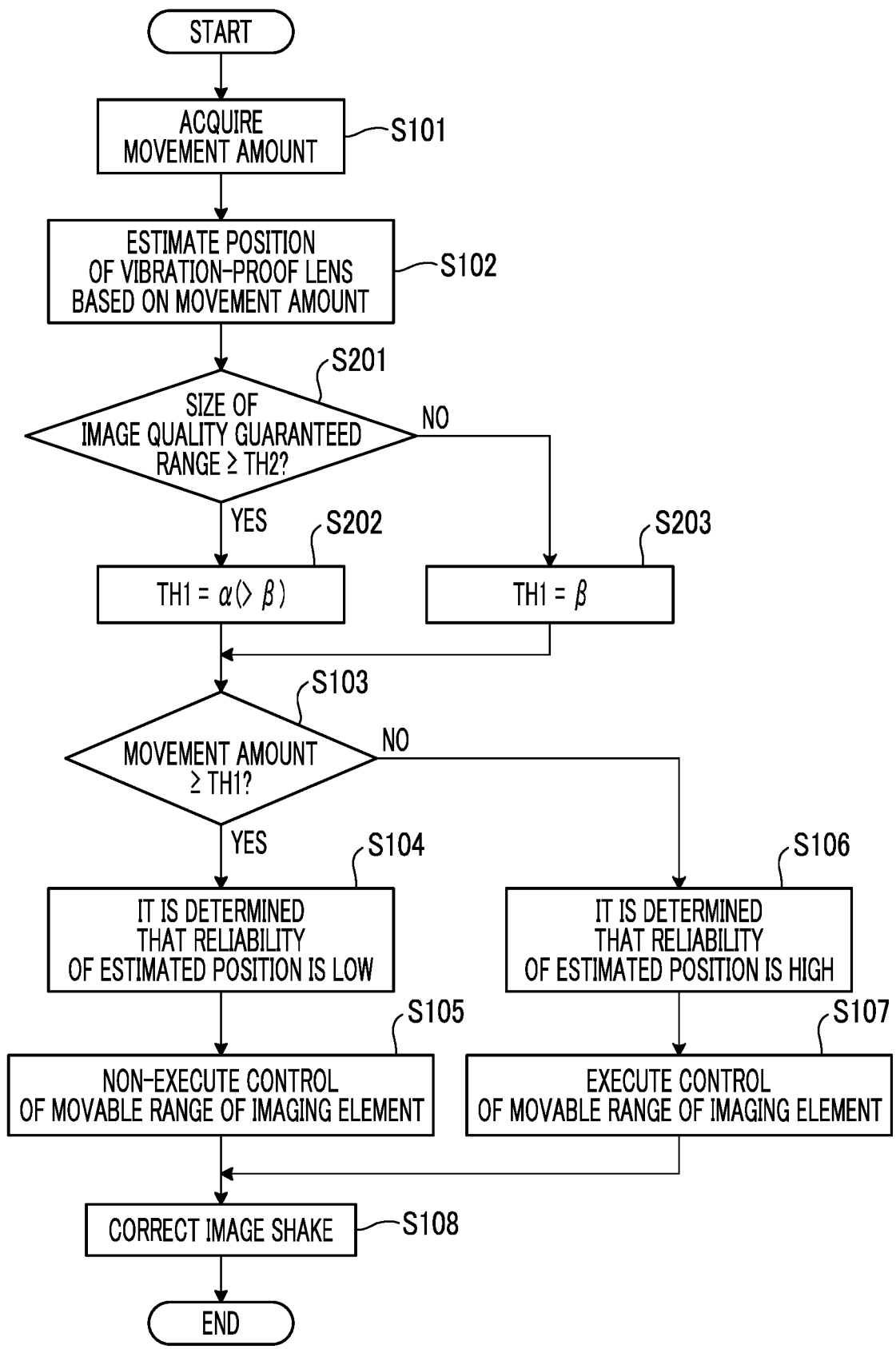
FIG. 7 is a flowchart for explaining a modification example of the image shake correction operation by the system control unit 18 shown in FIG. 5.

FIG. 7 is a flowchart for explaining a modification example of the image shake correction operation by the system control unit 18 shown in FIG. 5. The flowchart shown in FIG. 7 is the same as that of FIG. 6 except that step S201, step S202, and step S203 are added between step S102 and step S103 of the flowchart shown in FIG. 6. In FIG. 7, the same process as in FIG. 6 is designated by the same reference numeral and the description thereof will be omitted.

After step S102, the reliability determining unit 18C determines whether or not the image quality guaranteed range by the lens device 20 is equal to or more than a second threshold value TH2 (step S201). The image quality guaranteed range of the lens device 20 is decided by the optical information indicating the optical characteristics of the lens device 20, and refers to the range in which the subject image can be formed without distortion in the vicinity (width at the position on the light receiving surface of the subject image Im shown in FIGS. 3 and 4) within the range of the subject image (width in the direction perpendicular to the optical axis) formed on the light receiving surface of the imaging element 11 by the lens device 20, as described above. Information of the image quality guaranteed range can be acquired from the lens device 20 mounted on the camera main body 10 in a case in which the lens device 20 is replaceable device. Further, in a case in which the lens device 20 is fixed to the camera main body 10, the image quality guaranteed range is the information stored in advance in the memory 16.

In a case in which the size of the image quality guaranteed range is equal to or more than the second threshold value TH2 (step S201: YES), the reliability determining unit 18C sets the first threshold value TH1 to a ($\alpha > \beta$) (step S202), and in a case in which the size of the image quality guaranteed range is less than the second threshold value TH2 (step S201: NO), the reliability determining unit 18C sets the first threshold value TH1 to $\beta$ (step S203). After step S202 and step S203, the process after step S103 is performed.

The fact that the image quality guaranteed range by the lens device 20 is large means that the reliability of the estimated position of the vibration-proof lens 33 is somewhat low, and even in a case in which there is a possibility that some error occurs in the estimated position, the movable range R is controlled based on the estimated position, so that there is a possibility that the overlapping range of the image quality guaranteed range and the movable range R can be sufficiently large. As a result, the effect of improving the image quality by controlling the movable range R does not significantly deteriorate. That is, in a case in which the image quality guaranteed range by the lens device 20 is large, the effect of improving the image quality can be expected by controlling the position of the movable range R within the maximum movable range Rmax instead of fixing the movable range R.

On the other hand, the fact that the image quality guaranteed range by the lens device 20 is small means that the reliability of the estimated position of the vibration-proof lens 33 is somewhat low, and in a case in which there is a possibility that some error occurs in the estimated position, the movable range R is controlled based on the estimated position, so that there is high possibility that the overlapping range of the image quality guaranteed range and the movable range R is reduced. As a result, there is a possibility that the effect of improving the image quality by controlling the movable range R deteriorates. That is, in a case in which the image quality guaranteed range by the lens device 20 is small, the effect of improving the image quality can be expected by fixing the movable range R.

Therefore, as described above, in a case in which the image quality guaranteed range by the lens device 20 is equal to or more than the second threshold value TH2 (step S201: YES), as compared with a case in which the image quality guaranteed range is less than the second threshold value TH2 (step S201: NO), the first threshold value TH1 is set large (step S202), so that the possibility that the processing of controlling the position of the movable range R is performed can be optimized and the image quality of the captured image can be improved.

Figure 8:
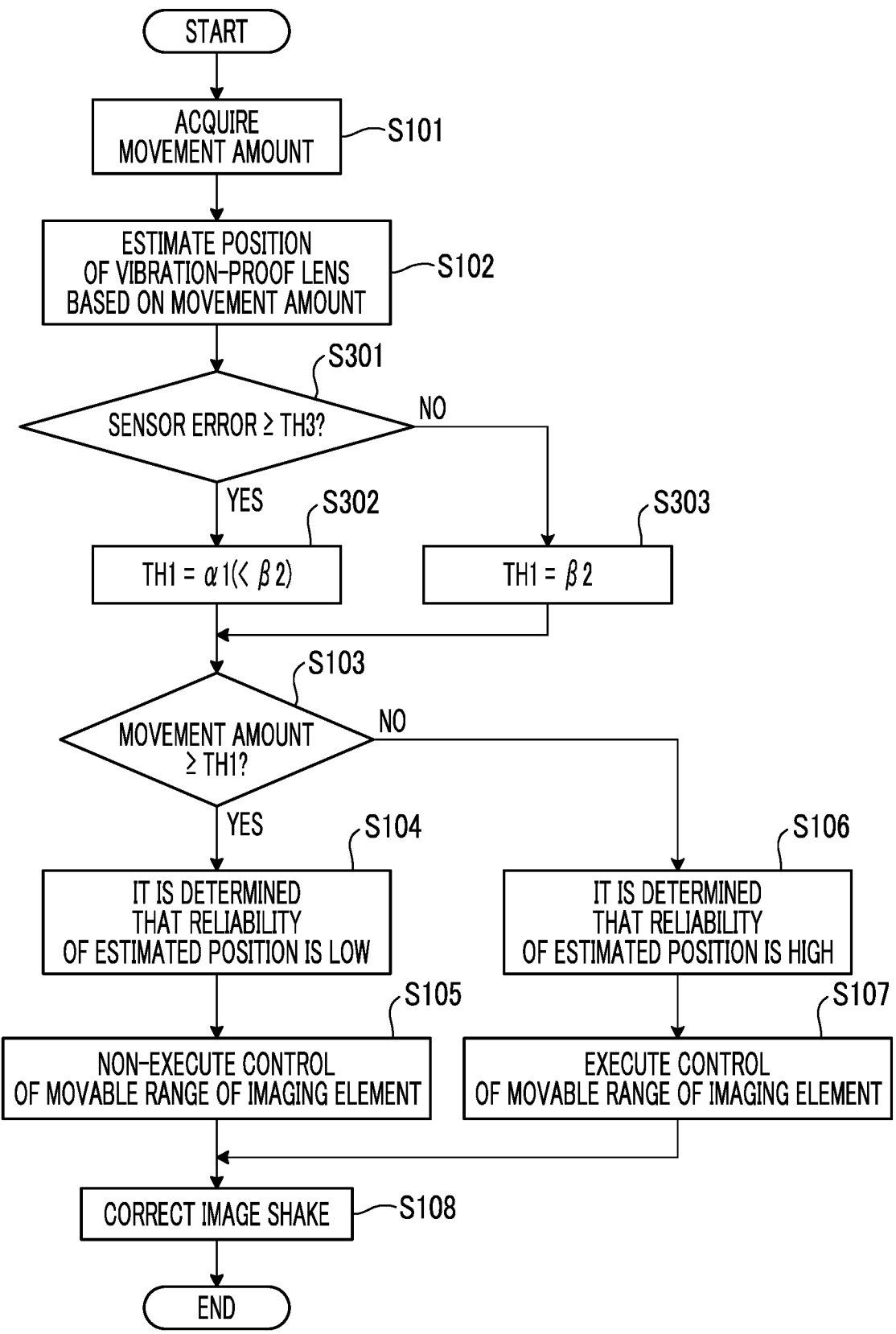
FIG. 8 is a flowchart for explaining another modification example of the image shake correction operation by the system control unit 18 shown in FIG. 5.

FIG. 8 is a flowchart for explaining another modification example of the image shake correction operation by the system control unit 18 shown in FIG. 5. The flowchart shown in FIG. 8 is the same as that of FIG. 6 except that step S301, step S302, and step S303 are added between step S102 and step S103 of the flowchart shown in FIG. 6. In FIG. 8, the same process as in FIG. 6 is designated by the same reference numeral and the description thereof will be omitted.

After step S102, in a case in which the sensor error which is the detection error of the movement detecting sensor 17 used for estimating the position of the vibration-proof lens 33 is equal to or more than a third threshold value TH3 (step S301: YES), the reliability determining unit 18C sets the first threshold value TH1 to $\alpha 2$ ($\alpha 2 < \beta 2$) (step S302), and in a case in which the sensor error is less than the third threshold value TH3 (step S301: NO), the reliability determining unit 18C sets the first threshold value TH1 to $\beta$ (step S303). After step S302 and step S303, the process after step S103 is performed.

Information of the detection error of the movement detecting sensor 17 is stored in advance in the memory 106. In some cases, the movement detecting sensor 17 is provided only in the lens device 20, and in that case, the system control unit 18 need only acquire the information of the detection error of the movement detecting sensor 17 from the lens device 20.

The fact that the detection error of the movement detecting sensor 17 is large means that the reliability of the estimated position of the vibration-proof lens 33 is low as compared with the case in which the detection error of the movement detecting sensor 17 is small. In a case in which the reliability of the estimated position of the vibration-proof lens 33 is low, there is a possibility of deterioration of the captured image quality due to controlling the position of the movable range R based on the estimated position, on the contrary, in a case in which the reliability of the estimated position of the vibration-proof lens 33 is high, the image quality can be expected to be improved due to controlling the position of the movable range R.

Therefore, as described above, in a case in which the sensor error is equal to or more than the third threshold value TH3 (step S301: YES), the first threshold value TH1 is set small (step S302) as compared with a case in which the sensor error is less than the third threshold value TH3 (step S301: NO), so that a possibility that the processing of controlling the position of the movable range R is performed can be reduced, deterioration of the captured image quality in a case in which the sensor error is large can be prevented, and in total, the image quality can be improved.

In the operation examples of FIGS. 6 to 8, in a case in which the movement amount of the digital camera 1 is equal to or more than the first threshold value TH1, it may be determined that the reliability of the estimated position is low, but by using the internal temperature of the camera main body 10 instead of this movement amount, in a case in which the temperature is equal to or more than the first threshold value TH1, it may be determined that the reliability of the estimated position is low, and in a case in which the temperature is less than the first threshold value TH1, it is determined that the reliability of the estimated position is low.

With this configuration, in a case in which as the movement detecting sensor 17, a gyro sensor or the like in which the detection error becomes large exceeding the allowable range in a case in which the temperature is equal to or more than the first threshold value TH1 is used, it is possible to prevent deterioration of the image quality due to controlling of the movable range R of the imaging element 11 based on the estimated position with low reliability. In a case in which the movement detecting sensor 17 is built in the lens device 20, the internal temperature of the lens device 20 need only be used instead of the internal temperature of the camera main body 10.

Further, the image shake correcting unit 18A described above corrects the image shake by the sensor shift correction, but the image shake correcting unit 18A may be replaced with the correcting unit that corrects the image shake by the electronic correction. In this case, which range of the subject image of the subject images formed on the light receiving surface of the imaging element 11 is acquired as the captured image, that is, the position of the acquisition range need only be controlled such that the acquisition range of the captured image from the imaging element 11 matches the image quality guaranteed range of the lens device 20.

Hereinafter, a configuration of a smartphone will be described as another embodiment of the imaging device of the present invention.

Figure 9:
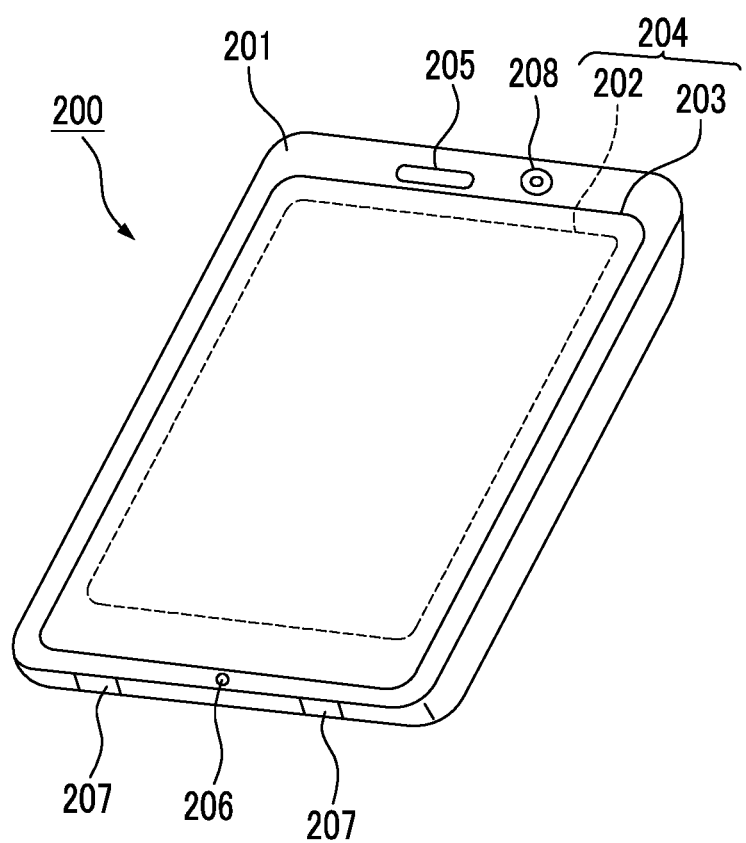
FIG. 9 is a view showing the appearance of a smartphone 200, which is an embodiment of an imaging device of the present invention.

FIG. 9 is a view showing the appearance of a smartphone 200 which is an embodiment of an imaging device of the present invention.

The smartphone 200 shown in FIG. 9 comprises a flat plate-shaped housing 201, and a display input unit 204 in which a display panel 202 as a display unit and an operation panel 203 as an input unit are integrated on one surface of the housing 201.

Further, the housing 201 comprises a speaker 205, a microphone 206, an operating unit 207, and a camera unit 208. The configuration of the housing 201 is not limited to this, and for example, a configuration in which the display unit and the input unit are separately provided, or a configuration having a folding structure or a slide mechanism can be adopted.

Figure 10:
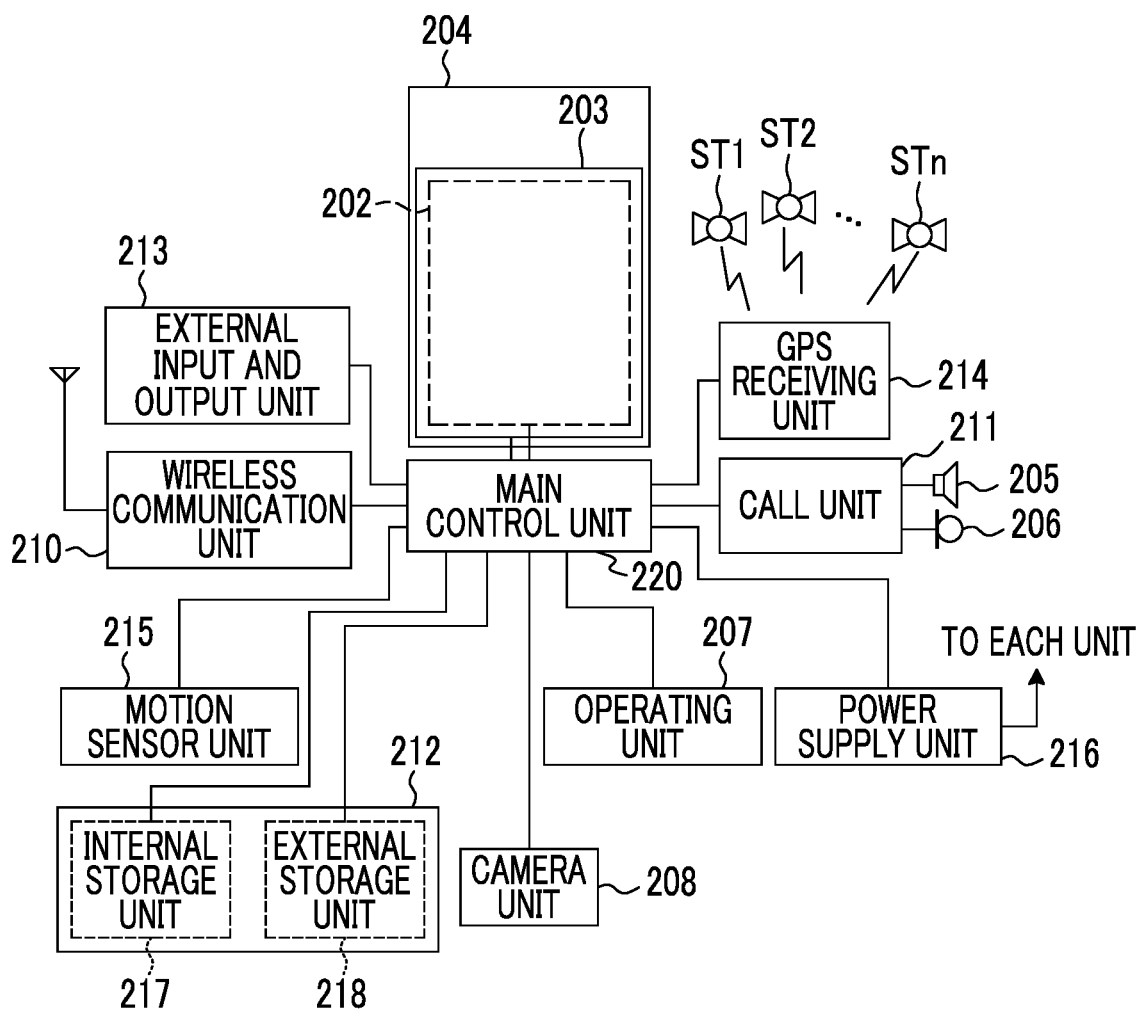
FIG. 10 is a block diagram showing a configuration of the smartphone 200 shown in FIG. 9.

FIG. 10 is a block diagram showing a configuration of the smartphone 200 shown in FIG. 9.

As shown in FIG. 10, the smartphone comprises, as main components, a wireless communication unit 210, the display input unit 204, a call unit 211, the operating unit 207, the camera unit 208, a storage unit 212, an external input and output unit 213, a global positioning system (GPS) receiving unit 214, a motion sensor unit 215, a power supply unit 216, and a main control unit 220.

The smartphone 200 has, as a main function, a wireless communication function for performing mobile wireless communication via a base station device BS (not shown) and a mobile communication network NW (not shown).

The wireless communication unit 210 performs wireless communication with the base station device accommodated in the mobile communication network in accordance with the command of the main control unit 220. Using the wireless communication, the transmission and reception of various file data, such as voice data and image data, e-mail data, and reception of web data, or streaming data, is performed.

The display input unit 204 is a so-called touch panel that displays images (still picture images and motion picture images) or text information under the control of the main control unit 220 to visually transmit the information to the user, and detects the user's operation to the displayed information, and comprises the display panel 202 and the operation panel 203.

The display panel 202 uses a liquid crystal display (LCD) or an organic electro-luminescence display (OELD) as a display device.

The operation panel 203 is a device which is placed to be capable of visually recognizing the image displayed on the display surface of the display panel 202, and is operated by the user's finger or a stylus to detect one or a plurality of coordinates. In a case in which the device is operated by the user's finger or the stylus, detection signals generated due to the operation are output to the main control unit 220. Then, the main control unit 220 detects an operation position (coordinate) on the display panel 202 based on the received detection signals.

As shown in FIG. 10, in the smartphone 200 as the embodiment of the imaging device of the present invention, the display panel 202 and the operation panel 203 are integrated to configure the display input unit 204, and the operation panel 203 is disposed to completely cover the display panel 202.

In a case in which such a disposition is adopted, the operation panel 203 may have a function of detecting the user's operation even in an area outside the display panel 202. Stated another way, the operation panel 203 may comprise a detection area for the overlapping portion (hereinafter, referred to as a display area) that overlaps the display panel 202, and a detection area for the outer edge portion (hereinafter, referred to as a non-display area) that does not overlap the display panel 202 other than the overlapping portion.

The size of the display area and the size of the display panel 202 may completely match, but it is not always necessary to match the sizes. Also, the operation panel 203 may comprise two sensitive areas in the outer edge portion and the inner portion other than the outer edge portion. Further, the width of the outer edge portion is appropriately designed depending on the size of the housing 201 and the like.

Furthermore, examples of a position detection method adopted in the operation panel 203 include a matrix switch method, a resistive film method, a surface acoustic wave method, an infrared method, an electromagnetic induction method, and a capacitance method, and any method can be adopted.

The call unit 211 comprises the speaker 205 or the microphone 206, and converts the user's voice which is input through the microphone 206 into voice data which can be processed by the main control unit 220 to output the converted voice data to the main control unit 220, or decodes the voice data received by the wireless communication unit 210 or the external input and output unit 213 to output the decoded voice data through the speaker 205.

As shown in FIG. 9, for example, the speaker 205 can be mounted on the same surface in which the display input unit 204 is provided, and the microphone 206 can be mounted on the side surface of the housing 201.

The operating unit 207 is a hardware key using a key switch or the like, and receives the command of the user. For example, as shown in FIG. 10, the operating unit 207 is mounted on the side surface of the housing 201 of the smartphone 200, and is a push button type switch that is turned on in a case of being pressed with a finger or the like and is turned off by a restoring force such as a spring in a case where the finger is released.

The storage unit 212 stores a control program and control data of the main control unit 220, application software, address data associated with the name or telephone number of a communication partner, data of transmitted and received e-mails, Web data downloaded from Web browsing, and downloaded content data, and temporarily stores streaming data and the like. The storage unit 212 is configured by an internal storage unit 217 built in the smartphone and an external storage unit 218 which has a slot for an attachable and detachable external memory.

Each of the internal storage unit 217 and the external storage unit 218 which configure the storage unit 212 is realized by using a storage medium such as a memory of a flash memory type, hard disk type, a multimedia card micro type, or a card type (for example, MicroSD (registered trademark) memory), a random access memory (RAM), a read only memory (ROM), and the like.

The external input and output unit 213 serves as an interface with all of the external devices connected to the smartphone 200, and is directly or indirectly connected to other external devices through communication (for example, a universal serial bus (USB), IEEE 1394, or the like), or a network (for example, the Internet, wireless LAN, Bluetooth (registered trademark), radio frequency identification (RFID), infrared data association (IrDA; registered trademark), ultra wideband (UWB; registered trademark), Zig-Bee (registered trademark), or the like).

Examples of the external devices connected to the smartphone 200 include a wired/wireless headset, a wired/wireless external charger, a wired/wireless data port, a memory card and a subscriber identity module (SIM)/user identity module (UIM) card connected via a card socket, external audio and video devices connected via audio and video input/output (I/O) terminals, wirelessly connected external audio and video devices, a wired/wireless connected smartphone, a wired/wirelessly connected personal computer, earphones, and the like.

The external input and output unit 213 can transmit data transmitted from such external devices to the components inside the smartphone 200, or transmit data inside the smartphone 200 to the external devices.

The GPS receiving unit 214 receives GPS signals transmitted from GPS satellites ST1 to STn in accordance with the command of the main control unit 220, and executes positioning calculation processing based on a plurality of the received GPS signals to detect the position of the smartphone 200 including latitude, longitude, and altitude. In a case in which positional information can be acquired from the wireless communication unit 210 or the external input and output unit 213 (for example, wireless LAN), the GPS receiving unit 214 can detect the position by using the positional information.

The motion sensor unit 215 comprises, for example, a three-axis acceleration sensor, and detects the physical movement of the smartphone 200 in accordance with the command of the main control unit 220. By detecting the physical movement of the smartphone 200, the moving direction or the acceleration of the smartphone 200 is detected. The detection result is output to the main control unit 220.

The power supply unit 216 supplies a power stored in a battery (not shown) to each unit of the smartphone 200 in accordance with the command of the main control unit 220.

The main control unit 220 comprises a microprocessor, operates in accordance with the control program and the control data stored in the storage unit 212, and controls the units of the smartphone 200 in an integrated manner. The main control unit 220 has a mobile communication control function of controlling the units of the communication system, and an application processing function in order to perform voice communication or data communication through the wireless communication unit 210.

The application processing function is realized by the main control unit 220 which operates in accordance with the application software stored in the storage unit 212. Examples of the application processing function include an infrared ray communication function of controlling the external input and output unit 213 to perform data communication with an opposite device, an e-mail function of performing transmission and reception of e-mail, or a web browsing function of browsing a web page.

Also, the main control unit 220 has an image processing function of displaying an image on the display input unit 204 based on the image data (data of still picture image or motion picture images) such as received data or downloaded streaming data.

The image processing function is a function in which the main control unit 220 decodes the image data, performs image processing on the decoding result, and displays the image on the display input unit 204.

Further, the main control unit 220 executes display control with respect to the display panel 202 and operation detecting control of detecting the user's operation through the operating unit 207 and the operation panel 203.

By executing the display control, the main control unit 220 displays a software key such as an icon or a scroll bar for starting an application software, or displays a window for creating an e-mail.

The scroll bar is a software key for receiving a command to move a displayed portion of the image for a large image that cannot fit in the display area of the display panel 202.

By executing the operation detecting control, the main control unit 220 detects the user's operation through the operating unit 207, receives the operation with respect to the icon and an input of the character string for the input field of the window through the operation panel 203, or receives a scroll request of the displayed image through the scroll bar.

By executing the operation detecting control, the main control unit 220 has a touch panel control function of determining whether the operation position on the operation panel 203 is the overlapping portion (display area) that overlaps the display panel 202 or the outer edge portion (non-display area) that does not overlap the display panel 202 other than the overlapping portion, and controlling the sensitive area of the operation panel 203 and the display position of the software key.

The main control unit 220 can detect a gesture operation on the operation panel 203 and execute a preset function in accordance with the detected gesture operation.

The gesture operation is not a usual simple touch operation, but is an operation of drawing a locus with fingers, designating a plurality of positions at the same time, or combining these operations to draw a locus for at least one from a plurality of positions.

The camera unit 208 includes a configuration other than the memory 16 and the system control unit 18 in the digital camera 1 shown in FIG. 1. In a case in which the smartphone 200 functions as the digital camera 1, the storage unit 212 has the function of the memory 16 and the main control unit 220 has the function of the system control unit 18.

The captured image data generated by the camera unit 208 can be stored in the storage unit 212 or can be output through the external input and output unit 213 or the wireless communication unit 210.

In the smartphone 200 shown in FIG. 9, the camera unit 208 is mounted on the same surface as the display input unit 204, but the mounting position of the camera unit 208 is not limited thereto, and the camera unit 208 may be mounted on the back surface of the display input unit 204.

The camera unit 208 can be used for various functions of the smartphone 200. For example, the image acquired by the camera unit 208 can be displayed on the display panel 202, or the image from the camera unit 208 can be used as one of operation input of the operation panel 203.

In a case in which the GPS receiving unit 214 detects the position, the position can be detected by referring to the image from the camera unit 208. Further, the optical axis direction of the camera unit 208 of the smartphone 200 can be determined or the current usage environment can be determined by referring the image from the camera unit 208 without using the three-axis acceleration sensor or using a combination of the image and the three-axis acceleration sensor. Needless to say, the image from the camera unit 208 can be used in the application software.

In addition, the image data of the still picture or the motion picture can be stored in the storage unit 212 with the positional information acquired by the GPS receiving unit 214, the voice information (it may be the text information acquired by converting the voice to the text by the main control unit) acquired by the microphone 206, or the posture information acquired by the motion sensor unit 215, or can be output through the external input and output unit 213 or the wireless communication unit 210.

The present invention is not limited to the above embodiments. For example, in the above embodiments, the image shake correcting unit 18A has a function of correcting the image shake by the sensor shift correction, but the image shake correcting unit 18A may have a function of correcting the image shake by the electronic correction.

At least the following matters are described in the present specification. The components and the like corresponding to the above embodiments are shown in parentheses, but the present invention is not limited to this.

(1) A control device (system control unit 18) of an imaging device (digital camera 1) that includes an imaging element (imaging element 11) which images a subject through a lens device (lens device 20) including a vibration-proof lens (vibration-proof lens 33), the control device comprising an image shake correcting unit (image shake correcting unit 18A) that corrects an image shake of a captured image output from the imaging element by moving the imaging element or moving an acquisition range of the captured image on a light receiving surface of the imaging element, and a lens position acquiring unit (lens position acquiring unit 18B) that acquires a position of the vibration-proof lens in a direction perpendicular to an optical axis (optical axis K) of the lens device, in which the image shake correcting unit controls a movable range (movable range R) of the imaging element or a movable range of the acquisition range based on the position of the vibration-proof lens acquired by the lens position acquiring unit.

With the control device according to (1), the movable range of the imaging element or the acquisition range of the captured image is controlled in accordance with the movement position of the vibration-proof lens for the lens shift correction, and the sensor shift correction is performed within the movable range, so that the range in which the image quality can be guaranteed by the sensor shift correction can be expanded to a wide range as compared with a case in which the movable range is not controlled. Therefore, it is possible to improve the captured image quality while realizing the high image shake performance.

(2) The control device of an imaging device according to (1), in which the image shake correcting unit sets a range (image quality guaranteed range), in a maximum movable range (maximum movable range Rmax) of the imaging element, which is decided based on the position of the vibration-proof lens and optical information of the lens device, as the movable range.

With the control device according to (2), the movable range is appropriately controlled within the maximum movable range, and the sensor shift correction is performed within the movable range, so that the range in which the image quality can be guaranteed by the sensor shift correction can be expanded to the maximum movable range.

(3) The control device of an imaging device according to (2), in which the lens position acquiring unit estimates the position of the vibration-proof lens based on a movement amount of the lens device or the imaging device, and acquires the estimated position as the position of the vibration-proof lens.

With the control device according to (3), it is not necessary to sequentially acquire the position of the vibration-proof lens from the lens device, so that the processing amount can be reduced.

(4) The control device of an imaging device according to (3), further comprising a reliability determining unit (reliability determining unit 11C) that determines reliability of an estimation result of the position, in which the image shake correcting unit decides, based on the reliability, whether or not to execute processing of controlling the movable range based on the position of the vibration-proof lens.

With the control device according to (4), it is possible to prevent deterioration of the image quality due to the normal execution of the processing of controlling the movable range of the imaging element regardless of the reliability of the estimated position of the vibration-proof lens.

(5) The control device of an imaging device according to (4), in which the image shake correcting unit executes the processing in a case in which the reliability is equal to or more than a predetermined reliability threshold value and fixes the movable range to a predetermined position without executing the processing in a case in which the reliability is less than the reliability threshold value.

With the control device according to (5), the processing of controlling the movable range of the imaging element is executed only in a case in which the reliability of the estimated position of the vibration-proof lens is high, so that it is possible to prevent deterioration of the image quality due to controlling the movable range of the imaging element based on the estimated position with low reliability.

(6) The control device of an imaging device according to (5), in which the reliability determining unit determines that the reliability is less than the reliability threshold value in a case in which the movement amount of the lens device or the imaging device is equal to or more than a predetermined first threshold value (first threshold value TH1).

With the control device according to (6), the processing of controlling the movable range of the imaging element is executed only in a case in which the movement amount of the lens device r the imaging device is equal to or more than the first threshold value, so that it is possible to prevent deterioration of the image quality due to controlling the movable range of the imaging element based on the estimated position with low reliability in the imaging device having a function in which the vibration-proof lens is returned to a predetermined position in a case in which the movement amount of the camera main body or the lens device is equal to or more than the first threshold value.

(7) The control device of an imaging device according to (6), in which the reliability determining unit determines that the reliability is less than the reliability threshold value in a case in which an internal temperature of the lens device or the imaging device is equal to or more than the predetermined first threshold value.

With the control device according to (7), since the detection error of the movement amount may exceed the allowable range in a case in which the temperature is equal to or more than the first threshold value, determination can be made that the reliability is low. Therefore, it is possible to prevent deterioration of the image quality due to controlling of the movable range of the imaging element based on the position with low reliability estimated at a temperature equal to or more than the first threshold value.

(8) The control device of an imaging device according to (6) or (7), in which the reliability determining unit controls the first threshold value based on a size of an image quality guaranteed range of the lens device.

With the control device according to (8), the image quality can be improved by changing the possibility that the processing of controlling the movable range of the imaging element is performed based on the size of the image quality guaranteed range by the lens device.

(9) The control device of an imaging device according to (8), in which the reliability determining unit sets the first threshold value to be larger in a case in which the size of the image quality guaranteed range is equal to or more than a predetermined size threshold value (second threshold value TH2), than a case in which the size is less than the size threshold value.

With the control device according to (9), in a case in which the image quality guaranteed range is wide, the image quality can be improved by increasing the possibility that the processing of controlling the movable range of the imaging element is performed.

(10) The control device of an imaging device according to (6) or (7), in which the reliability determining unit controls the first threshold value based on information of a detection error of a movement detecting sensor (movement detecting sensor 17) which is mounted on the lens device or the imaging device and detects the movement amount.

With the control device according to (10), the image quality can be improved by changing the possibility that the processing of controlling the movable range of the imaging element is performed based on the information of the detection error of the movement detecting sensor.

(11) The control device of an imaging device according to (10), in which the reliability determining unit sets the first threshold value to be smaller in a case in which the detection error is equal to or more than a predetermined error threshold value (third threshold value TH3), than a case in which the detection error is less than the error threshold value.

With the control device according to (11), in a case in which the detection error of the movement detecting sensor is more than the error threshold value, it is possible to prevent deterioration of the image quality by decreasing the possibility that the processing of controlling the movable range of the imaging element is performed.

(12) An imaging device comprising the control device according to any one of (1) to (11), and the imaging element.

(13) An imaging device comprising the control device according to (1) or (2), a position detecting unit (lens position detecting sensor 35) that detects the position of the vibration-proof lens, and the vibration-proof lens.

With the imaging device according to (12) or (13), the movable range of the imaging element is controlled in accordance with the movement position of the vibration-proof lens for the lens shift correction, and the sensor shift correction is performed within the movable range, so that the image quality guaranteed range can be expanded to a wide range by the sensor shift correction as compared with a case in which the movable range is not controlled. Therefore, it is possible to improve the captured image quality while realizing the high image shake performance.

(14) A control method of an imaging device that includes an imaging element which images a subject through a lens device including a vibration-proof lens, the method comprising an image shake correcting step of correcting an image shake of a captured image output from the imaging element by moving the imaging element or moving an acquisition range of the captured image on a light receiving surface of the imaging element, and a lens position acquiring step of acquiring a position of the vibration-proof lens in a direction perpendicular to an optical axis of the lens device, in which in the image shake correcting step, a movable range of the imaging element or a movable range of the acquisition range is controlled based on the position of the vibration-proof lens acquired in the lens position acquiring step.

(15) The control method of an imaging device according to (14), in which in the image shake correcting step, a range in a maximum movable range of the imaging element, which decided based on the position of the vibration-proof lens and optical information of the lens device is set as the movable range.

(16) The control method of an imaging device according to (15), in which in the lens position acquiring step, the position of the vibration-proof lens is estimated based on a movement amount of the lens device or the imaging device, and the estimated position is acquired as the position of the vibration-proof lens.

(17) The control method of an imaging device according to (16), further comprising a reliability determining step of determining reliability of an estimation result of the position, in which in the image shake correcting step, it is decided, based on the reliability, whether or not to execute processing of controlling the movable range based on the position of the vibration-proof lens.

(18) The control method of an imaging device according to (17), in which in the image shake correcting step, the processing is executed in a case in which the reliability is equal to or more than a predetermined reliability threshold value and the movable range is fixed to a predetermined position without executing the processing in a case in which the reliability is less than the reliability threshold value.

(19) The control method of an imaging device according to (18), in which in the reliability determining step, it is determined that the reliability is less than the reliability threshold value in a case in which the movement amount of the lens device or the imaging device is equal to or more than a predetermined first threshold value.

(20) The control method of an imaging device according to (18), in which in the reliability determining step, it is determined that the reliability is less than the reliability threshold value in a case in which an internal temperature of the lens device or the imaging device is equal to or more than a predetermined first threshold value.

(21) The control method of an imaging device according to (19) or (20), in which in the reliability determining step, the first threshold value is controlled based on a size of an image quality guaranteed range of the lens device.

(22) The control method of an imaging device according to (21), in which in the reliability determining step, the first threshold value is set to be larger in a case in which the size of the image quality guaranteed range is equal to or more than a predetermined size threshold value, than a case in which the size is less than the size threshold value.

(23) The control method of an imaging device according to (19) or (20), in which in the reliability determining step, the first threshold value is controlled based on information of a detection error of a movement detecting sensor which is mounted on the lens device or the imaging device.

(24) The control method of an imaging device according to (23), in which in the reliability determining step, the first threshold value is set to be smaller in a case in which the detection error is equal to or more than a predetermined error threshold value, than a case in which the detection error is less than the error threshold value.

(25) A control program of an imaging device that includes an imaging element which images a subject through a lens device including a vibration-proof lens, the program causing a computer to execute a control method of the imaging device, in which the control method includes an image shake correcting step of correcting an image shake of a captured image output from the imaging element by moving the imaging element or moving an acquisition range of the captured image on a light receiving surface of the imaging element, and a lens position acquiring step of acquiring a position of the vibration-proof lens in a direction perpendicular to an optical axis of the lens device, and in the image shake correcting step, a movable range of the imaging element or a movable range of the acquisition range is controlled based on the position of the vibration-proof lens acquired in the lens position acquiring step.

Although various embodiments have been described above with reference to the drawings, it is needless to say that the present invention is not limited to this. It is obvious that those skilled in the art can conceive various changes or modifications within the scope described in the claims, and naturally, such changes or modifications also belong to the technical scope of the present invention. Further, the components in the embodiments described above may be optionally combined without departing from the spirit of the invention.

The present application is based on a Japanese patent application filed on Feb. 27, 2019 (Japanese Patent Application No. 2019-034957), the contents of which are incorporated herein by reference.

The present invention is highly convenient and effective in a case of being applied to a digital camera such as a single-lens reflex camera or a mirrorless camera, an in-vehicle camera, a surveillance camera, a smartphone, and the like.

EXPLANATION OF REFERENCES

1: digital camera
10: camera main body
11: imaging element
12: imaging element moving mechanism
13: AFE
14: imaging element drive unit
15: image processing unit
16: memory
17: movement detecting sensor
18: system control unit
18A: image shake correcting unit
18B: lens position acquiring unit
11C: reliability determining unit
20: lens device
30: imaging optical system
31: imaging lens
32: imaging lens drive mechanism
33: vibration-proof lens
34: vibration-proof lens drive mechanism
35: lens position detecting sensor
40: lens control unit
Im: subject image
K: optical axis
R: movable range
Rmax: maximum movable range
200: smartphone
201: housing
202: display panel
203: operation panel
204: display input unit
205: speaker
206: microphone
207: operating unit
208: camera unit
210: wireless communication unit
211: call unit
212: storage unit
213: external input and output unit
214: GPS receiving unit
215: motion sensor unit
216: power supply unit
217: internal storage unit
218: external storage unit
220: main control unit
ST1 to STn: GPS satellite

What is claimed is:

1. A control device of an imaging device that comprises an imaging element which images a subject through a lens device comprising a vibration-proof lens and a vibration-proof lens drive mechanism having a lens position detecting sensor disposed adjacent to the vibration-proof lens, the control device comprising:

an image shake correcting unit that corrects an image shake of a captured image output from the imaging element by moving the imaging element or moving an acquisition range of the captured image on a light receiving surface of the imaging element;

a lens position acquiring unit that acquires a position of the vibration-proof lens, detected by the lens position detecting sensor of the vibration proof lens drive mechanism, in a direction perpendicular to an optical axis of the lens device, wherein the lens position acquiring unit estimates the position of the vibration-proof lens based on a movement amount of the lens device or the imaging device, and acquires the estimated position as the position of the vibration-proof lens; and a reliability determining unit that determines reliability of an estimation result of the position, wherein the image shake correcting unit controls a movable range of the imaging element or a movable range of the acquisition range based on the position of the vibration-proof lens acquired by the lens position acquiring unit, wherein the image shake correcting unit sets a range in a maximum movable range of the imaging element, which is decided based on the position of the vibration-proof lens and optical information of the lens device, as the movable range, and wherein the image shake correcting unit decides, based on the reliability, whether or not to execute processing of controlling the movable range based on the position of the vibration-proof lens.

2. The control device of an imaging device according to claim 1, wherein the image shake correcting unit executes the processing in a case in which the reliability is equal to or more than a predetermined reliability threshold value and fixes the movable range to a predetermined position without executing the processing in a case in which the reliability is less than the reliability threshold value.

3. The control device of an imaging device according to claim 2, wherein the reliability determining unit determines that the reliability is less than the reliability threshold value in a case in which the movement amount of the lens device or the imaging device is equal to or more than a predetermined first threshold value.

4. The control device of an imaging device according to claim 2, wherein the reliability determining unit determines that the reliability is less than the reliability threshold value in a case in which an internal temperature of the lens device or the imaging device is equal to or more than a predetermined first threshold value.

5. The control device of an imaging device according to claim 3, wherein the reliability determining unit controls the first threshold value based on a size of an image quality guaranteed range of the lens device.

6. The control device of an imaging device according to claim 5, wherein the reliability determining unit sets the first threshold value to be larger in a case in which the size of the image quality guaranteed range is equal to or more than a predetermined size threshold value, than a case in which the size is less than the size threshold value.

7. The control device of an imaging device according to claim 3, wherein the reliability determining unit controls the first threshold value based on information of a detection error of a movement detecting sensor which is mounted on the lens device or the imaging device and detects the movement amount.

8. The control device of an imaging device according to claim 7, wherein the reliability determining unit sets the first threshold value to be smaller in a case in which the detection error is equal to or more than a predetermined error threshold value, than a case in which the detection error is less than the error threshold value.

9. An imaging device comprising:
the control device according to claim 1; and
the imaging element.

10. An imaging device comprising:
the control device according to claim 1;
a position detecting unit that detects the position of the vibration-proof lens; and
the vibration-proof lens.

11. A control method of an imaging device that comprises an imaging element which images a subject through a lens device comprising a vibration-proof lens and a vibration-proof lens drive mechanism having a lens position detecting sensor disposed adjacent to the vibration-proof lens, the method comprising:

an image shake correcting step of correcting an image shake of a captured image output from the imaging element by moving the imaging element or moving an acquisition range of the captured image on a light receiving surface of the imaging element;

a lens position acquiring step of acquiring a position of the vibration-proof lens, detected by the lens position detecting sensor of the vibration proof lens drive mechanism, in a direction perpendicular to an optical axis of the lens device, wherein the position of the vibration-proof lens is estimated based on a movement amount of the lens device or the imaging device, and the estimated position is acquired as the position of the vibration-proof lens; and a reliability determining step of determining reliability of an estimation result of the position, wherein, in the image shake correcting step, a movable range of the imaging element or a movable range of the acquisition range is controlled based on the position of the vibration-proof lens acquired in the lens position acquiring step, wherein, in the image shake correcting step, a range in a maximum movable range of the imaging element, which is decided based on the position of the vibration-proof lens and optical information of the lens device is set as the movable range, and wherein the image shake correcting step decides, based on the reliability, whether or not to execute processing of controlling the movable range based on the position of the vibration-proof lens.

12. The control method of an imaging device according to claim 11, wherein, in the image shake correcting step, the processing is executed in a case in which the reliability is equal to or more than a predetermined reliability threshold value, and the movable range is fixed to a predetermined position without executing the processing in a case in which the reliability is less than the reliability threshold value.

13. The control method of an imaging device according to claim 12, wherein the reliability determining step determines that the reliability is less than the reliability threshold value in a case in which the movement amount of the lens device or the imaging device is equal to or more than a predetermined first threshold value.

14. The control method of an imaging device according to claim 12, wherein the reliability determining step determines that the reliability is less than the reliability threshold value in a case in which an internal temperature of the lens device or the imaging device is equal to or more than a predetermined first threshold value.

15. The control method of an imaging device according to claim 13,
wherein, in the reliability determining step, the first threshold value is controlled based on a size of an image quality guaranteed range of the lens device.

16. The control method of an imaging device according to claim 15,
wherein, in the reliability determining step, the first threshold value is set to be larger in a case in which the size of the image quality guaranteed range is equal to or more than a predetermined size threshold value, than a case in which the size is less than the size threshold value.

17. The control method of an imaging device according to claim 13,
wherein, in the reliability determining step, the first threshold value is controlled based on information of a detection error of a movement detecting sensor which is mounted on the lens device or the imaging device and detects the movement amount.

18. The control method of an imaging device according to claim 17,
wherein, in the reliability determining step, the first threshold value is set to be smaller in a case in which the detection error is equal to or more than a predetermined error threshold value, than a case in which the detection error is less than the error threshold value.

19. A non-transitory computer readable medium storing a control program of an imaging device that includes an imaging element which images a subject through a lens device including a vibration-proof lens and a vibration-proof lens drive mechanism having a lens position detecting sensor disposed adjacent to the vibration-proof lens, the program causing a computer to execute a control method of the imaging device,
wherein the control method comprises
an image shake correcting step of correcting an image shake of a captured image output from the imaging element by moving the imaging element or moving an acquisition range of the captured image on a light receiving surface of the imaging element,
a lens position acquiring step of acquiring a position of the vibration-proof lens, detected by the lens position detecting sensor of the vibration proofer lens drive mechanism, in a direction perpendicular to an optical axis of the lens device, wherein the position of the vibration-proof lens is estimated based on a movement amount of the lens device or the imaging device, and the estimated position is acquired as the position of the vibration-proof lens, and
a reliability determining step of determining reliability of an estimation result of the position,
in the image shake correcting step, a movable range of the imaging element or a movable range of the acquisition range is controlled based on the position of the vibration-proof lens acquired in the lens position acquiring step,
wherein, in the image shake correcting step, a range in a maximum movable range of the imaging element, which is decided based on the position of the vibration-proof lens and optical information of the lens device is set as the movable range, and
wherein the image shake correcting step decides, based on the reliability, whether or not to execute processing of controlling the movable range based on the position of the vibration-proof lens.

* * * * *